Figure 1:
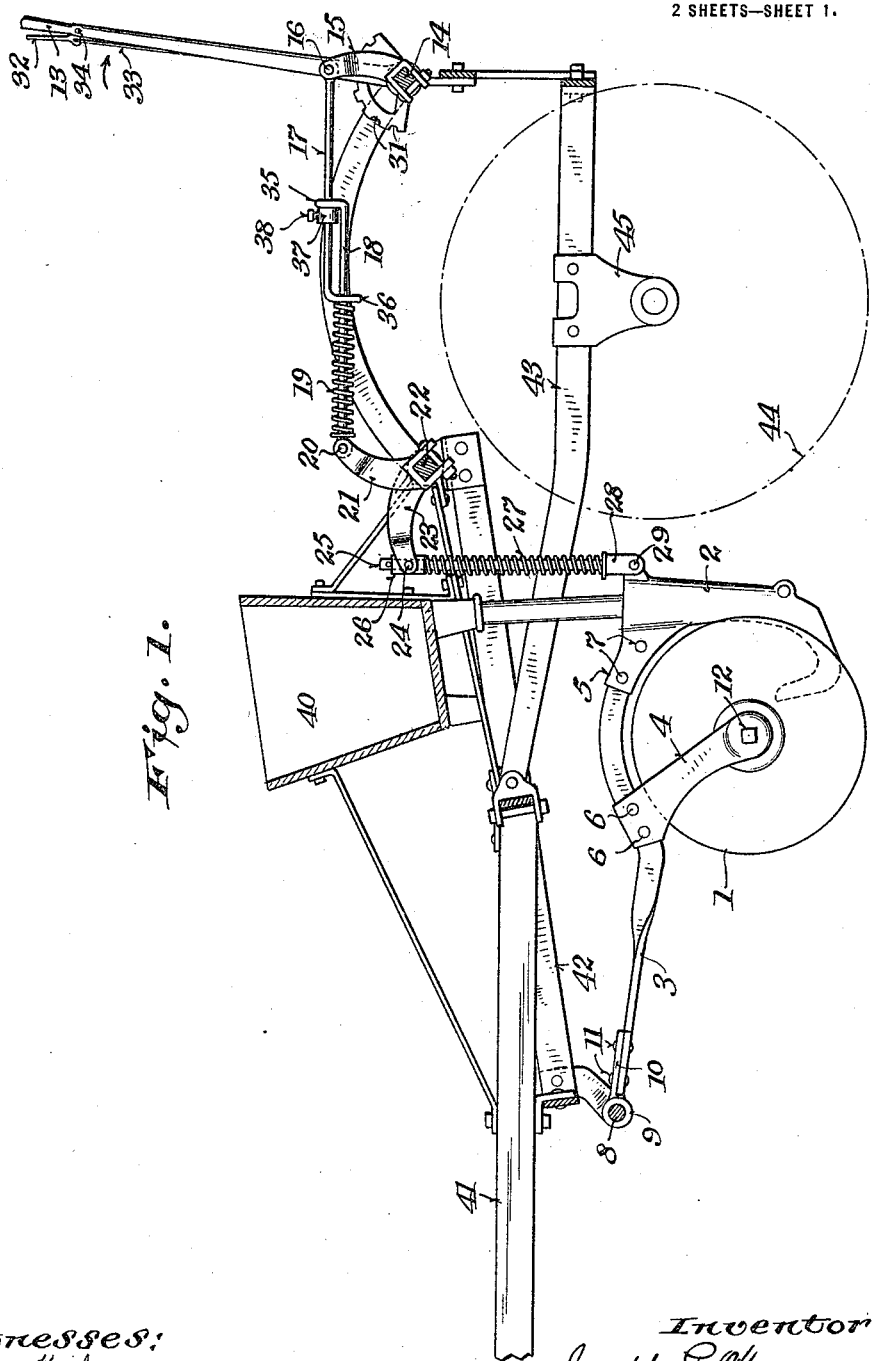

J. P. OFFERMAN.
CONVERGING DISK MECHANISM.
APPLICATION FILED APR. 12, 1915.

1,193,595.

Patented Aug. 8, 1916.
2 SHEETS—SHEET 1.

Witnesses:
a. J. McKerlan
I. D. Bremer.

Inventor;
Joseph P. Offerman
By Erwin & Wheeler
Attorneys.

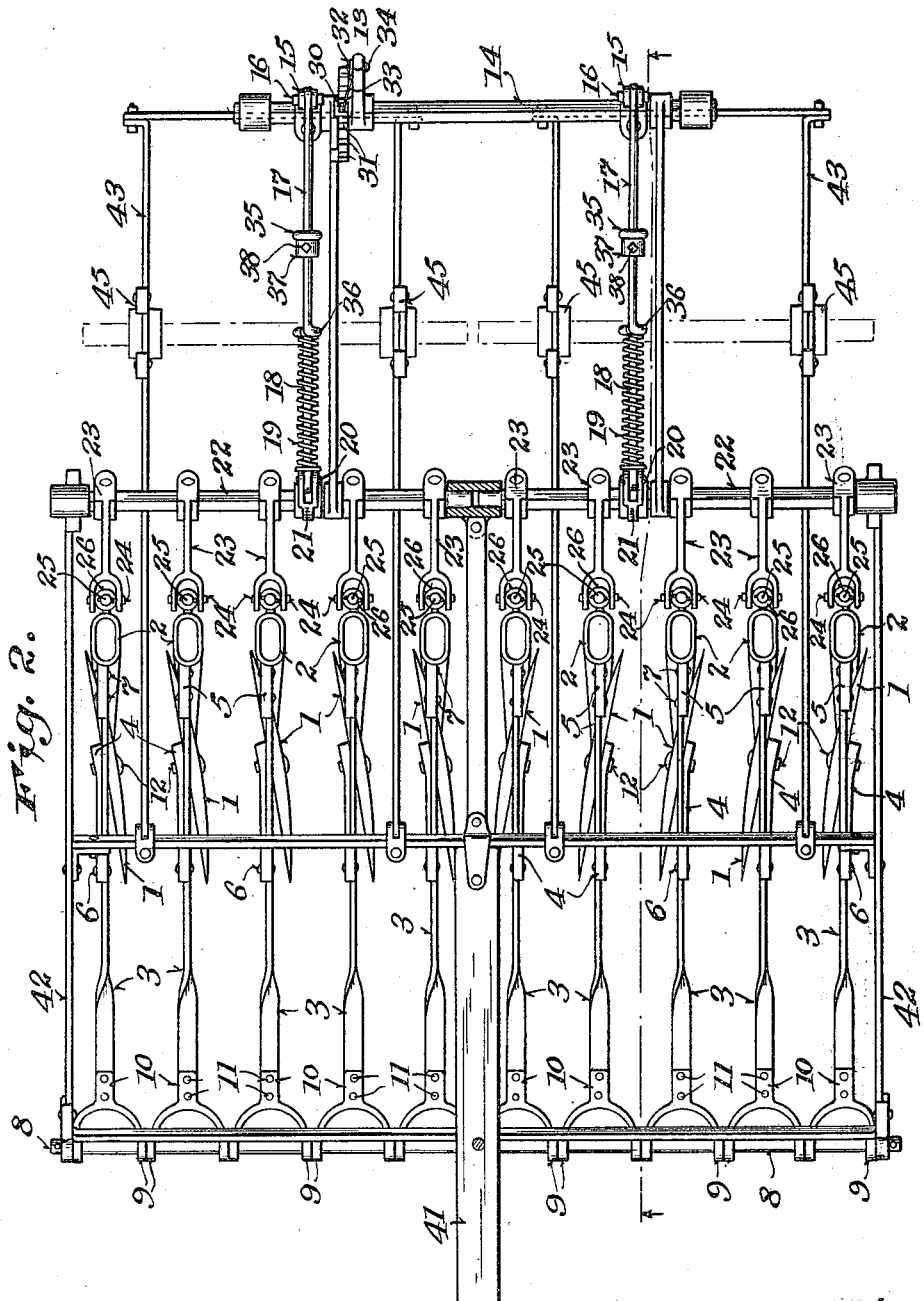

UNITED STATES PATENT OFFICE.

JOSEPH P. OFFERMAN, OF BEAVER DAM, WISCONSIN.

CONVERGING DISK MECHANISM.

1,193,595.  Specification of Letters Patent.  Patented Aug. 8, 1916.

Application filed April 12, 1915. Serial No. 20,659.

*To all whom it may concern:*

Be it known that I, JOSEPH P. OFFERMAN, a citizen of the United States, residing at the city of Beaver Dam, county of Dodge, and State of Wisconsin, have invented new and useful Improvements in Converging Disk Mechanism, of which the following is a specification.

My invention relates to improvements in disk harrows and seeders, and it pertains more especially among other things to the device for manually raising and lowering the disks or disk and seed ducts when such ducts are used, and for retaining such members at any desired point of adjustment.

My invention is explained by reference to the accompanying drawings, in which—

Figure 1 represents a longitudinal vertical section, and Fig. 2 is a plan view thereof, the hopper and connecting mechanism being removed.

Like parts are identified by the same reference numerals in both views.

1 represents a disk, a series of which are shown in Fig. 2.

2 is a seed duct. The seed duct 2 is connected with the disk 1 by the draw bar 3, shanks 4 and 5 and bolts 6, 6 and 7, 7. The front end of the draw bar 3 is pivotally connected with the draft rod 8 by the sleeve 9, bar 10 and bolts 11. Thus it is obvious that any movement that is applied to the duct 2 for the purpose of raising or lowering the same will be simultaneously communicated to the disk 1. The disk 1 is revolubly connected with the shank 4 by a bolt 12.

13 is an operating handle. The handle 13 is connected with the seed duct 2 through the horizontal shaft 14, arm 15, pivotal bolt 16, links 17 and 18, spring 19, pivotal bolt 20, arms 21, horizontal shaft 22, arm 23, pivotal bolt 24, rod 25, sleeve 26, spiral spring 27, lugs 28 and pivotal bolt 29. Thus it is obvious that by a rearward movement of the lever 13 in the direction indicated by the arrow said disk 1 and seed duct 2 will be raised, while by a reverse movement of said lever 13 said disk and duct will be lowered, whereby such members 1 and 2 will be caused to penetrate the soil a greater or less depth as circumstances may require, and said disk and duct are adapted to be retained at any desired point of adjustment by the pawl 30 which is adapted to engage in any one of the series of notches 31, 31, and motion is communicated to said pawl through the lever 32 and rod 33. The lever 32 is pivotally connected to the side of the handle 13 by pivotal bolt 34, whereby it is obvious that by closing the hand around the lever 32 and the upper end of the handle said pawl will be raised, whereby the lever 13 may be adjusted forwardly or rearwardly to any desired point corresponding with the notches 31 when the lever 32 is released, whereby the pawl is free to enter one of said notches and thereby retain the disk and seed duct at the desired point of adjustment. The links 17 and 18 are slidably connected together by the circular loops 35 and 36, and the link 17 is provided with a stop block 37 which is slidably supported thereon and secured at any desired point of adjustment by the locking bolt 38, which has threaded bearings in said stop block and is adapted when properly adjusted to be screwed down in the threaded bearings so as to impinge against said links 17. Thus it will be obvious that as the lever 13 is drawn rearwardly the stop block 37 will be caused to bear against the circular loop 35, whereby said disk 1 and seed duct 2 will be raised. By a reverse movement of the lever 13 the circular loop 37 will be caused to bear against the spring 19, whereby the arm 21 will be moved rearwardly thus communicating a downward movement to said disk and seed duct through the shaft 22, arm 23, pivotal bolt 24, slidable member 26, spring 27, lugs 28 and bolt 29, whereby said disk and seed duct will be caused to penetrate the earth a greater depth. It will, of course, be understood that when the desired adjustment of the disk 1 and seed duct 2 have been thus produced the parts will be retained at the desired point of adjustment by again releasing the hand lever 32, whereby the lever 13 will be again locked at the desired place.

I wish it to be understood that the hopper 40, member 41, frame members 42 and 43, and the supporting wheels, indicated by the dotted lines 44 and connecting mechanism 45 are substantially of ordinary construction, and invention herein is predicated, more especially as stated, upon the device for raising and lowering the disk 1 and seed duct 2 and mechanism for retaining such members 1 and 2 at the desired point of adjustment.

It will be understood that by interposing the spring 19 between the circular member 36 and the arm 21 and the spring 27 between the arm 23 and lugs 28 said disk and seed duct will be forced downwardly by a yielding movement which will permit them to rise as may be required when passing over an obstruction.

Having thus described my invention what I claim as new and desire to secure by Letters Patent, is:—

The combination of a supporting frame, a draw bar pivotally connected at one end to the frame and carrying earth engaging elements, an operating handle pivotally connected near one end with said supporting frame, a pair of links, means for slidably and yieldingly connecting said links together one of said links being connected to said handle, a horizontal rocking bar, an arm connected at one end to said bar and at its opposite end to the other of said links, a second arm connected at one end with said horizontal bar and slidably connected at its opposite end with a third link through a pivotal bolt and a sliding collar, a spring interposed between said sliding collar and lugs formed on the opposite end of said link, said lugs being pivotally connected with said earth engaging elements, whereby when said handle is moved in one direction said earth engaging elements are forced downward with a yielding pressure, and whereby when said lever is moved in the opposite direction said earth engaging elements will be raised, and means for securing said operating handle at any desired point of adjustment, all substantially as and for the purpose specified.

In testimony whereof I affix my signature in the presence of two witnesses.

JOSEPH P. OFFERMAN.

Witnesses:
 SAM EALSER,
 HILDA J. LIEBIG.

Copies of this patent may be obtained for five cents each, by addressing the "Commissioner of Patents, Washington, D. C."